(12) United States Patent
Wischmeyer

(10) Patent No.: US 7,184,883 B2
(45) Date of Patent: Feb. 27, 2007

(54) GPS-BASED STEERING NEEDLE INSTRUMENT

(75) Inventor: Carl Edward Wischmeyer, Prescott, AZ (US)

(73) Assignee: Embry. Riddle Aeronautical University, Inc., Daytona Beach, FL (US)

( * ) Notice: Subject to any disclaimer, the term of this patent is extended or adjusted under 35 U.S.C. 154(b) by 262 days.

(21) Appl. No.: 11/036,546

(22) Filed: Jan. 14, 2005

(65) Prior Publication Data
US 2006/0161336 A1    Jul. 20, 2006

(51) Int. Cl.
G01C 21/36    (2006.01)

(52) U.S. Cl. .............. 701/200; 701/205; 701/211; 701/213; 342/357.06; 342/357.01

(58) Field of Classification Search .......... 701/3, 701/200, 211, 213–214, 205; 342/357.06, 342/357.01; 340/426.19
See application file for complete search history.

(56) References Cited

U.S. PATENT DOCUMENTS

| 5,375,059 | A | * | 12/1994 | Kyrtsos et al. ............ 701/215 |
| 5,415,712 | A | * | 5/1995 | Thamboo ................... 148/707 |
| 5,546,093 | A | * | 8/1996 | Gudat et al. ............... 701/214 |
| 5,610,815 | A | * | 3/1997 | Gudat et al. ................. 701/23 |
| 5,751,245 | A | * | 5/1998 | Janky et al. ........... 342/357.07 |
| 6,111,526 | A | * | 8/2000 | Aymeric et al. ............ 340/972 |
| 6,917,644 | B2 | * | 7/2005 | Cahn et al. ................ 375/142 |
| 2005/0113111 | A1 | * | 5/2005 | Dupont et al. ........... 455/456.1 |

* cited by examiner

Primary Examiner—Y. Beaulieu
(74) Attorney, Agent, or Firm—John Wiley Horton

(57) ABSTRACT

A a flight instrument enabling a pilot to intercept and precisely follow a predefined GPS track. The instrument—known as a GPS steering indicator—provides a visual display which is similar in appearance to other aircraft instruments (and therefore instantly recognizable to nearly all pilots). However, the instrument is preferably differentiated somewhat in its visual appearance to convey to the pilot the fact that it displays steering commands rather than cross track error. An indicator needle deflects to instruct the pilot which way to turn and how much to turn in order to intercept and fly along a predefined GPS track. By centering the indicator needle, the pilot maintains the desired instantaneous track.

33 Claims, 17 Drawing Sheets

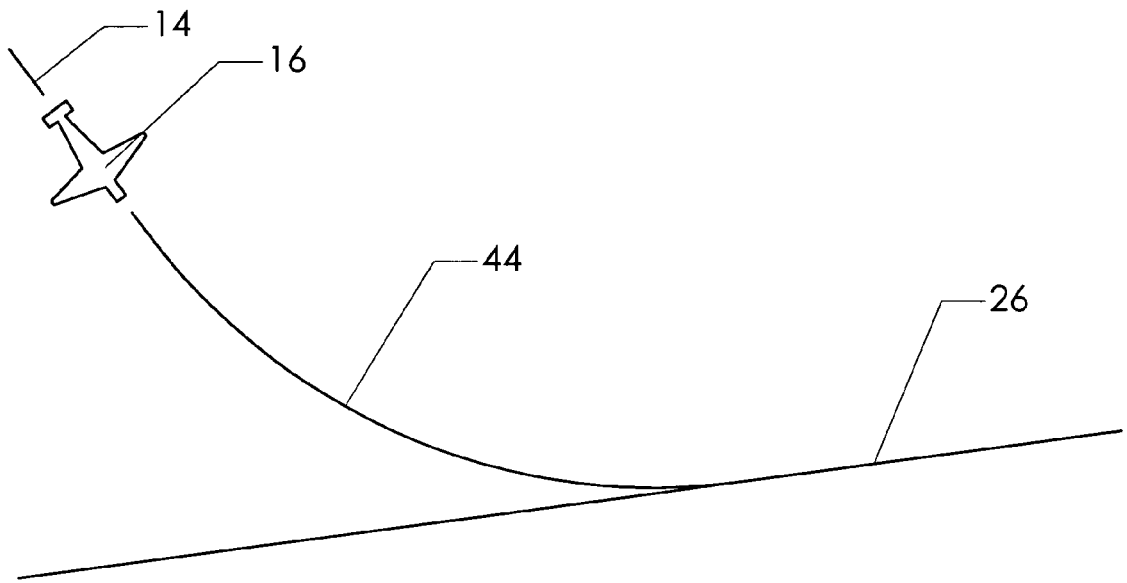
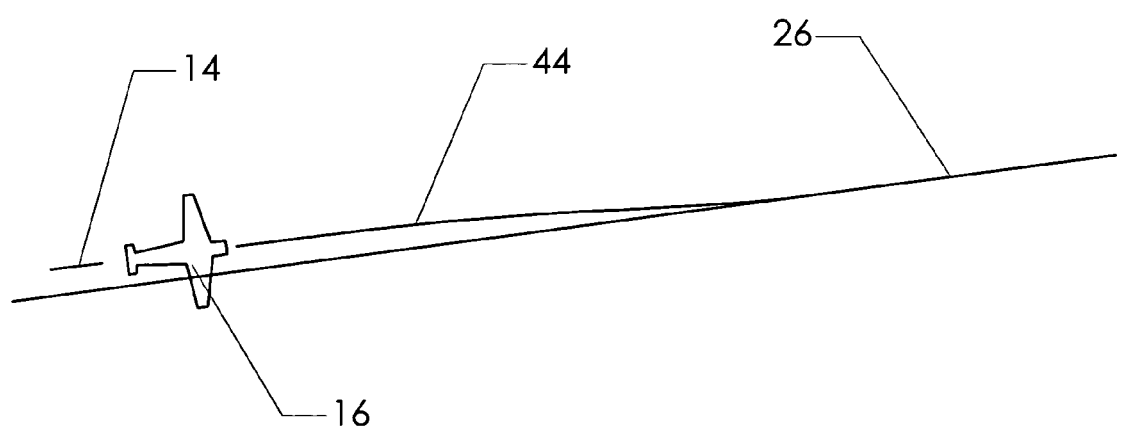
FIG. 9

GPS-BASED STEERING NEEDLE INSTRUMENT

BACKGROUND OF THE INVENTION

1. Field of the Invention

This invention relates to the field of navigation. More specifically, the invention comprises a needle indicator which provides a simple visual reference allowing a user to guide a moving vehicle along a defined course. The invention can use a course defined by waypoints or just a constant track made good (angle over the ground).

2. Description of the Related Art

Aircraft navigation has been focused for the past several decades on radio frequency instruments. One common instrument is a VHF Omni Range station ("VOR"). Those skilled in the art will know that VOR's transmit a signal with two modulations, and that the phase difference between these two modulations is read by airborne instruments to display the radial "from" or bearing "to" the VOR station.

In use, a VOR receiver is typically set to "look" for a specific radial (such as the 180 degree radial, or the 255 degree radial). A visual indicator is provided to inform the pilot when the designated radial is crossed (described in greater detail subsequently).

VOR's are line-of-sight devices. Thus, in flying across the country, a pilot will traditionally navigate from VOR to VOR as they come in range. FIG. 1 shows a cross-country flight using two VOR's for navigation. Upon departing the runway at origin 10, the pilot sets the VOR receiver to "look" for the 180° radial emanating from VOR1. Once this radial is intersected, the pilot flies along the radial toward VOR 1.

Upon reaching VOR1, the pilot resets the VOR receiver to "look" for the 105° radial emanating from VOR2. Once this is intersected the pilot flies along this radial until reaching the proximity of destination 12 (Aircraft 16's actual track along the ground is denoted as ground track 14).

VOR receivers provide a visual indication to the pilot to direct his or her course. FIGS. 2 and 3 show prior art VOR indicators 18 in operation. These are typically a round "gauge" style instrument, having a center 22 and several visual reference markers 20. An indicator needle 24 moves left and right across the surface according to the aircraft's position with respect to the selected radial.

The VOR receiver has a tuning dial, which must be set to the frequency for the desired VOR. A second adjustment allows the user to select the desired radial. In FIG. 2, the 180° radial has been selected. To/From setting 46 reads "To," indicating that the aircraft is headed toward the VOR station rather than away from it. Various selection switches are customarily provided for such instruments. As these are well known in the art, they have not been illustrated.

In FIG. 2, aircraft 16 is approaching the 180° radial, but the radial still lies off to the aircraft's left. The state of VOR indicator 18 correspond's to the aircraft's position. Indicator needle 24 is off to the left, but is moving toward the center since the aircraft is approaching the selected radial.

In FIG. 3, the aircraft has turned onto a course paralleling the radial (due north), but has overshot slightly. Indicator needle 24 has shifted to right of center—indicating that the radial is off to the right—but will move back toward center as the aircraft's course converges on the radial. A bit of course oscillation is typical as the pilot tries to center and stabilize the needle. This is especially true when first intersecting the radial, as the aircraft's course may be forty degrees or more off the radial's heading.

Returning now to FIG. 1, the reader will appreciate some of the limitations of VOR-based navigation. A direct route between the origin and destination is preferable. Such a route is not available, however, since VOR2 is not within range of the origin airport. As stated previously, VOR's are line-of-sight devices. Their signals can be obstructed by mountains. Their accessibility is also limited by the altitude of the aircraft, with the range being reduced when an aircraft is at low altitude. Navigation instruments using the Global Positioning System ("GPS") have become widely available in recent years. GPS instruments have the following advantages: (1) They allow point to point navigation, meaning that it is not necessary to pass over unwanted waypoints, as with VOR navigation; and (2) A good signal is generally available at all altitudes, even near the ground in rough terrain.

By the same token, existing GPS navigation devices are known to have certain well-accepted limitations, including: (1) They require the pilot to estimate headings in order to intercept a course line and to then track the course line, increasing the pilot's work load; and (2) They require the pilot to use a generally separate heading device, such as a directional gyroscope (introducing traditional problems such as gyroscopic precession, inaccurate initialization of the gyro compass, etc.).

The increased work load results from the system's reliance on the pilot's mental calculations. The GPS device can provide the pilot with a real-time reading for cross-track error, but the pilot must then mentally estimate an appropriate heading correction to bring the aircraft onto the desired course. An experienced pilot is quite capable of doing this. The pilot will attempt to fly the intercepting course by monitoring the gyro compass or other heading indicator, while simultaneously monitoring the shrinking value of the cross-track error on the GPS cross-track error display.

Performing such a maneuver consumes a substantial portion of the pilot's available working capacity. If he or she is dealing with other factors—such as instrument weather conditions and hazardous terrain—the attention required to perform the intercepting maneuver would be better directed elsewhere.

Some very sophisticated prior art devices solve many of these problems. Commercial airliners often include a "Flight Director." This instrument uses a computer to blend VOR or other navigational sources with heading information (often supplied from a gyro compass or similar inertial navigation device). A Flight Director gives the pilot immediate visual feedback regarding how much to bank the aircraft to properly intercept and track a selected course. They can also provide visual feedback regarding pitch commands needed to maintain a desired vertical track (such as a planned descent).

Flight Directors have disadvantages, however, including: (1) They are far too expensive for implementation in most small aircraft; (2) They require a modified attitude indicator in order to display the pitch and roll commands; (3) They require an accurate and integrated heading source; and (4) They depend upon the integration of several previously separate systems (attitude indicator, gyro compass etc.). This last fact means that a Flight Director provides little redundancy in the instrumentation. If one of the primary instruments fails, the Flight Director is unlikely to provide meaningful assistance.

Despite the disadvantages explained for the traditional VOR display, the reader will appreciate that the "needle" indicator provides a simple and intuitive means of directing the aircraft. Further, almost all pilots are familiar with using such an instrument. Thus, providing an intuitive indicator such as seen in FIGS. 2 and 3, while eliminating the drawbacks inherent in the traditional navigation instruments is desirable.

BRIEF SUMMARY OF THE INVENTION

The present invention comprises a flight instrument enabling a pilot to intercept and precisely follow a predefined GPS track. The instrument—known as a GPS steering indicator—provides a visual display which is similar in appearance to other aircraft instruments (and therefore instantly recognizable to nearly all pilots). However, the instrument is preferably differentiated somewhat in its visual appearance to convey to the pilot the fact that it displays steering commands rather than cross track error. An indicator needle deflects to instruct the pilot which way to turn and how much to turn in order to intercept and fly along a predefined GPS track. By centering the indicator needle, the pilot maintains the desired instantaneous track.

The invention can be enhanced by providing additional features to the instrument, such as a non-linear scale with heightened sensitivity near the center. Other additional features may include turn cues and a countdown to the next required maneuver. The instrument can also be programmed to provide cues by moving the indicator needle itself, such as gradually deflecting the indicator needle in the direction of an upcoming turn several seconds prior to actually reaching the curve in the GPS track.

The invention can be further enhanced by "fusing" different information sources. For example, the steering needle concept can fuse localizer (the lateral deviation portion of an Instrument Landing System) and GPS data, such that the GPS data provides the ground track data ordinarily estimated by a Flight Director, and the localizer provides the guidance required for the approach. This data fusion provides localizer accuracy with the ease of use of the GPS steering needle concept.

BRIEF DESCRIPTION OF THE SEVERAL VIEWS OF THE DRAWINGS

FIG. 9 is a plan view, showing the use of a computed intersection track to intercept a GPS track and to track a GPS track.

REFERENCE NUMERALS IN THE DRAWINGS

| | |
|---|---|
| 10 origin | 12 destination |
| 14 ground track | 16 aircraft |
| 18 VOR indicator | 20 reference marker |
| 22 center | 24 indicator needle |
| 26 GPS track | 28 heading |
| 30 target bearing | 32 desired course |
| 34 cross track error | 36 GPS steering indicator |
| 38 left turn cue | 40 right turn cue |
| 42 character display | 44 computed intersection track |
| 46 vector | 48 fine/coarse indicator |
| 50 linearized segment | 52 currently desired track |
| α linearized segment heading | |
| β currently desired track heading | |
| γ aircraft ground track heading | |
| ε heading angle error | |

DETAILED DESCRIPTION OF THE INVENTION

Figure 4:
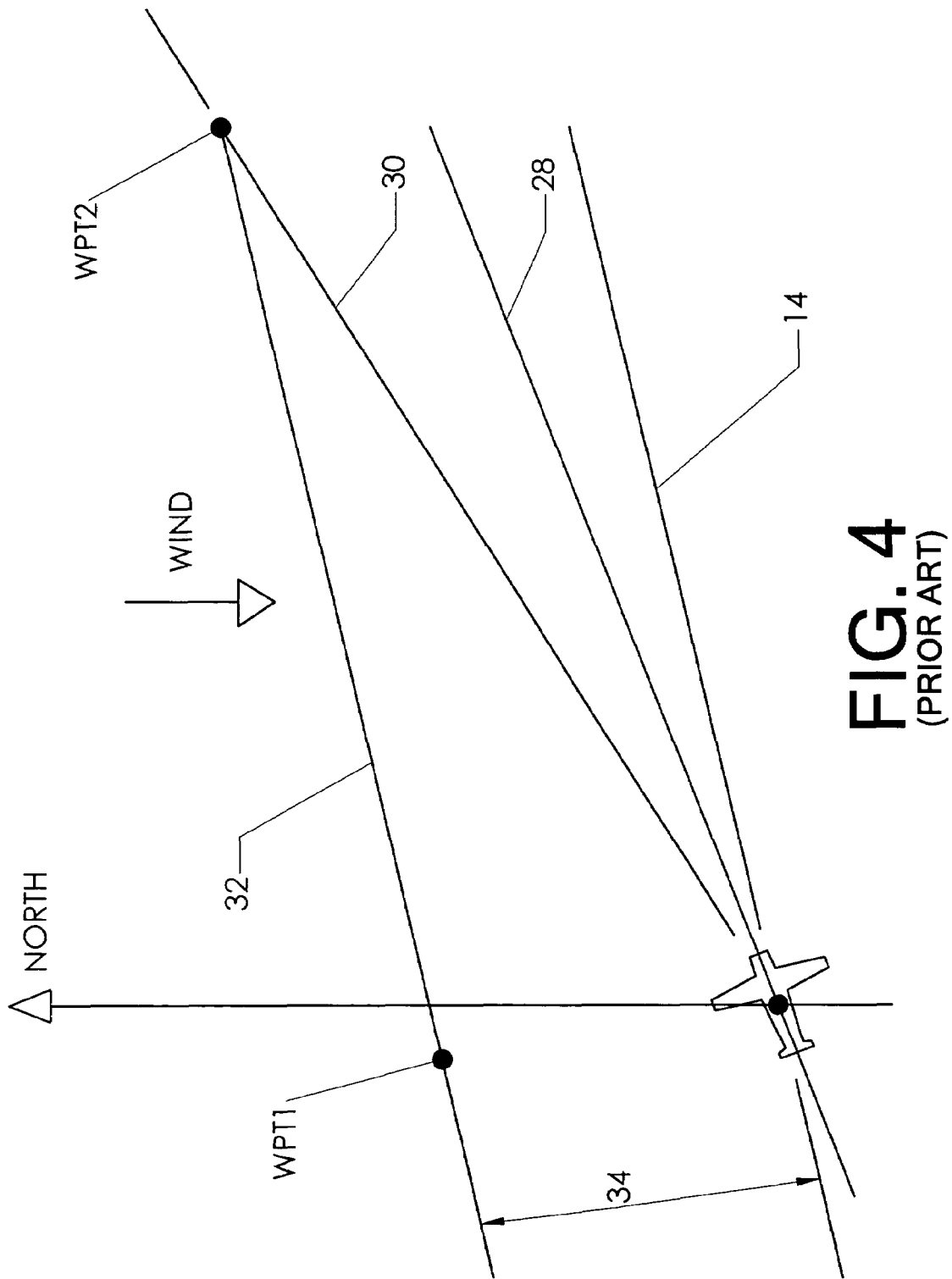
FIG. 4 is a plan view, graphically displaying common navigation terms.

FIG. 4 is a schematic plan view graphically displaying some common navigation terms which are useful to the reader's understanding. Aircraft 16 is attempting to fly along desired course 32, which lies between two waypoints (WPT1 and WPT2). The aircraft is oriented along a heading 28. The cross wind causes the aircraft to move along ground track 14, meaning that it is slipping laterally as it flies instead of moving purely along its heading. Target bearing 30 is a vector drawn from the aircraft to the destination (WPT2).

The reader will observe that the aircraft is located some distance away from the desired course. This distance is commonly known as cross track error 34, which represents the perpendicular distance between the aircraft and the desired course.

Significantly, GPS navigation units have the ability to accurately measure two of the most important values shown in FIG. 4 (The term "GPS navigation unit" will be understood to include the actual receiving unit, the associated data manipulation and storage equipment, and the associated display equipment. It may encompass two or more separate devices). If a user defines two or more waypoints, the GPS navigation unit can easily compute the desired course. For complex courses, many GPS navigation units can even calculate a smoothly curved course which efficiently transitions from one leg to the next.

Figure 1:
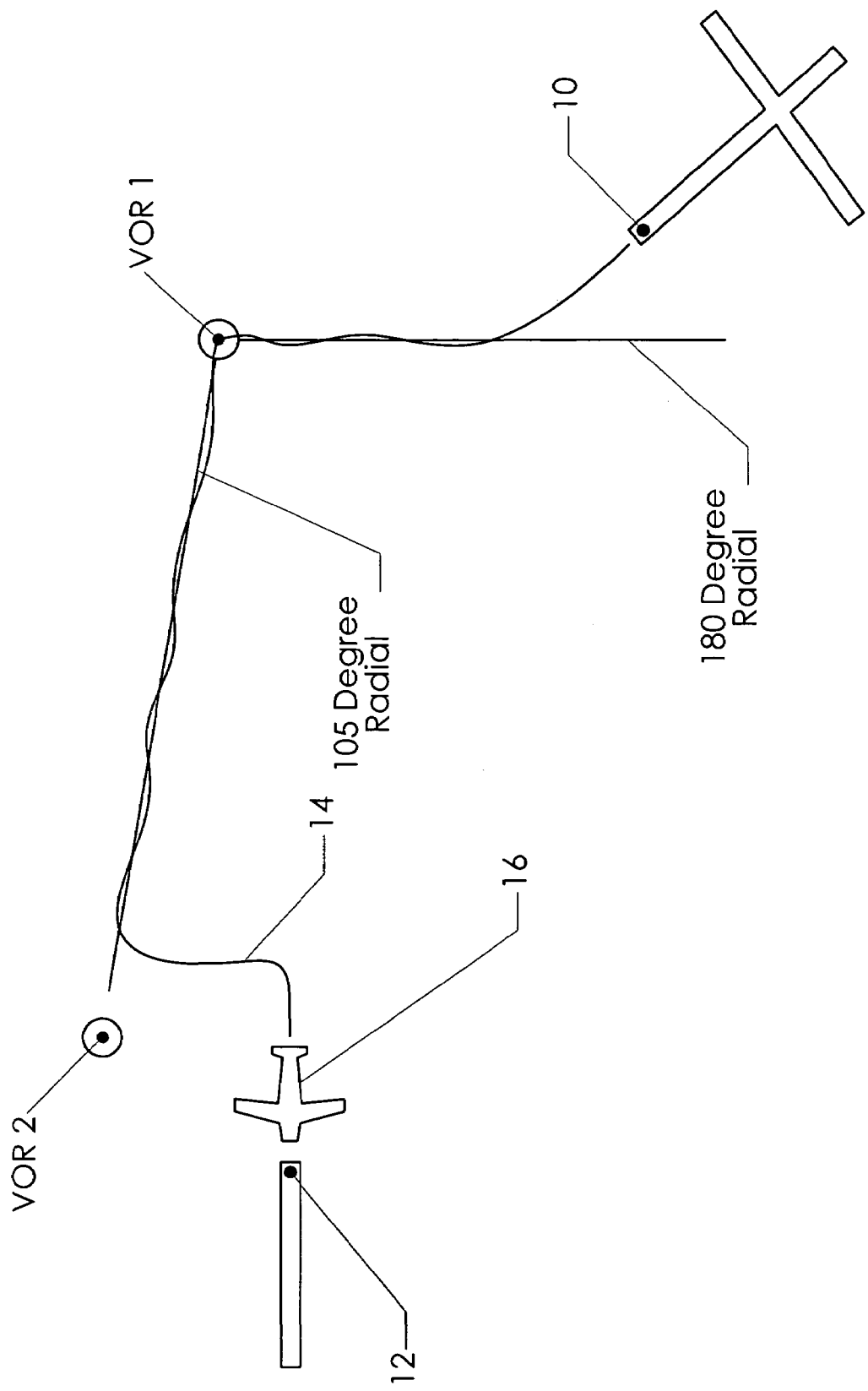
FIG. 1 is a plan view, showing the use of prior art navigational aids.
Figure 2:
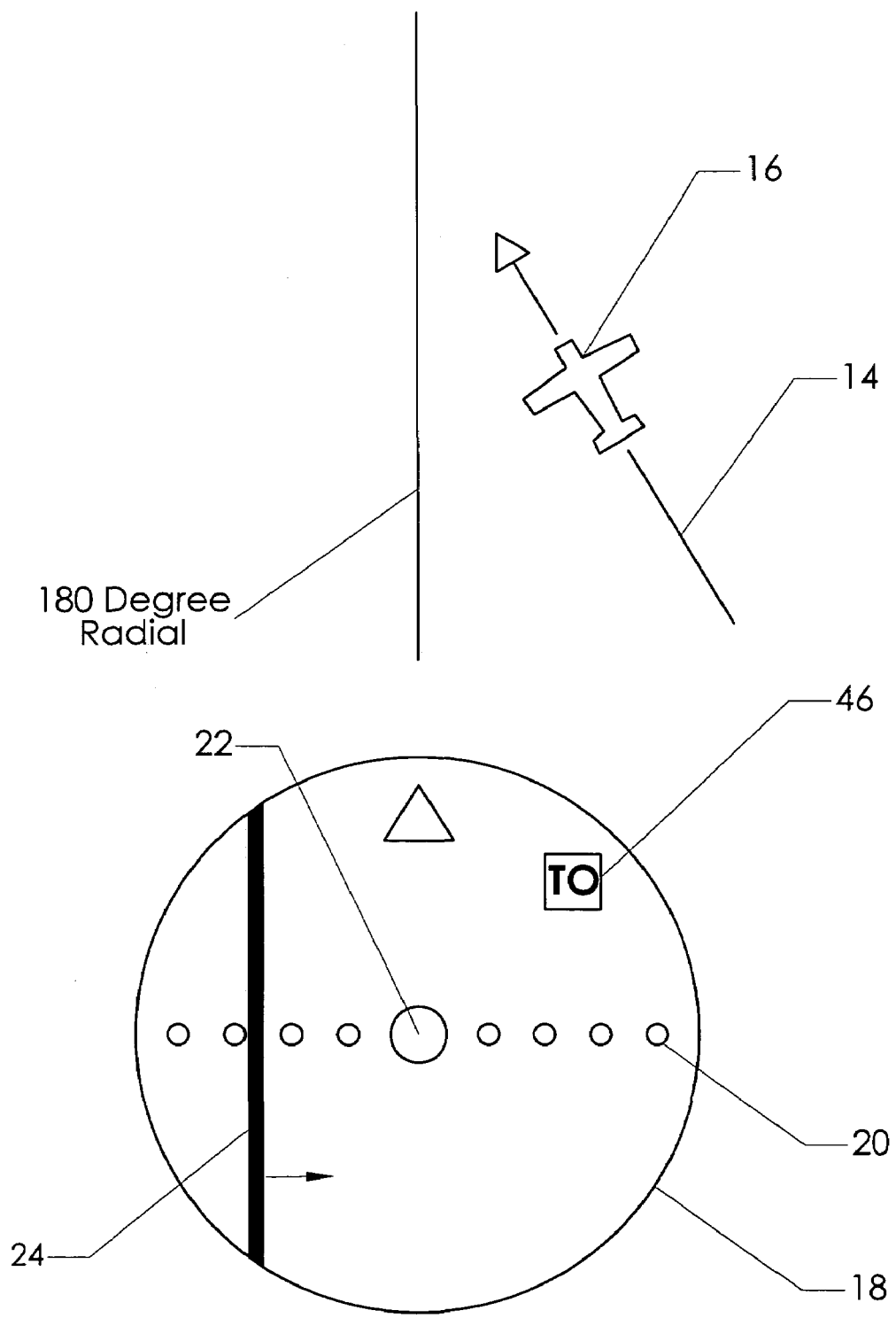
FIG. 2 is a schematic view, showing the response of a VOR indicator to an aircraft's proximity to a selected VOR radial.
Figure 3:
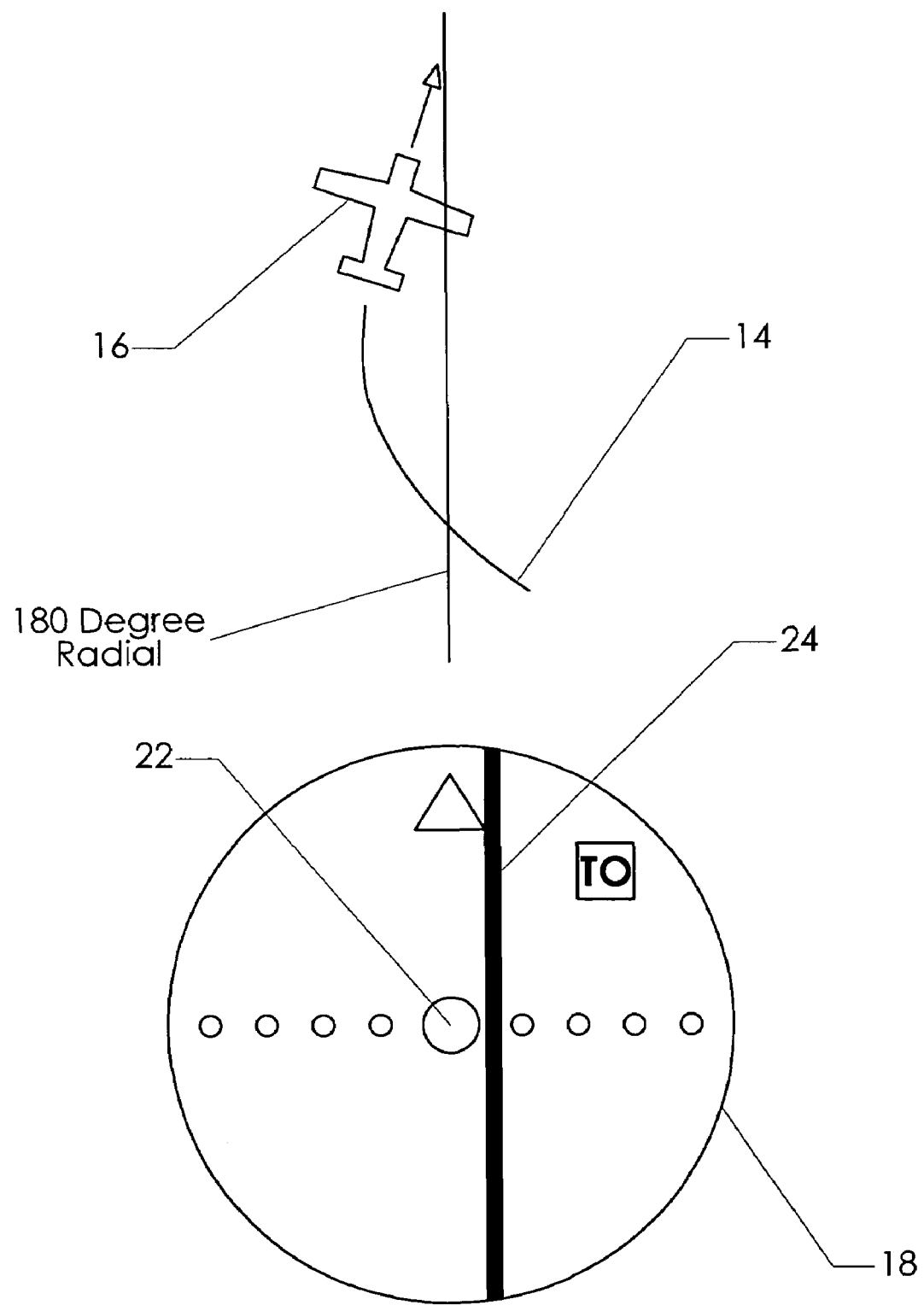
FIG. 3 is a schematic view, showing the response of a VOR indicator to an aircraft's proximity to a selected VOR radial.
Figure 5:
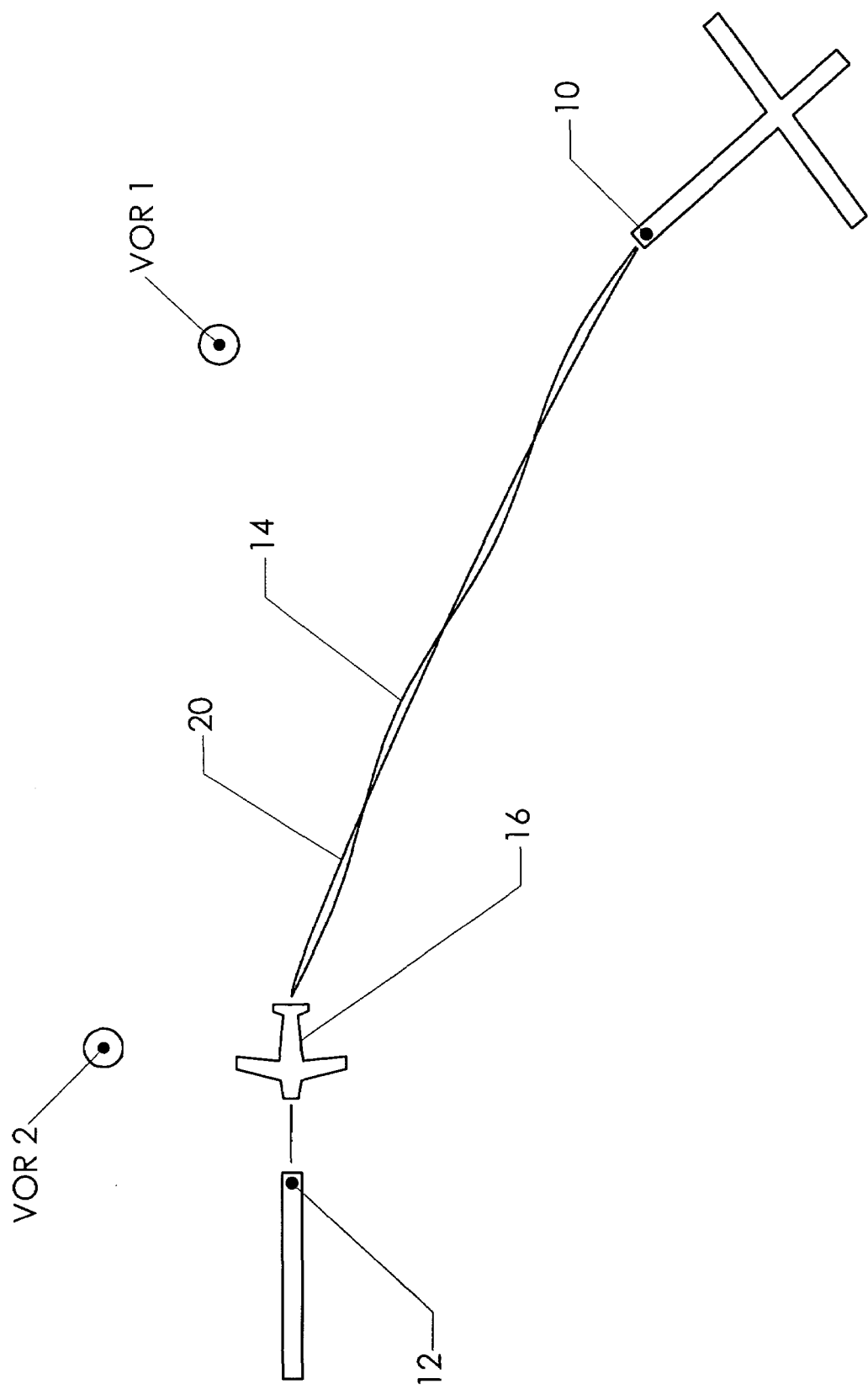
FIG. 5 is a plan view, showing a flight according to the present invention.

GPS navigation units can also accurately determine the ground track, since they can determine positions within a 3 to 10 meter resolution. Knowing the desired course and the actual ground track allows the GPS navigation unit to compute cross track error. This is a conventional parameter available in many GPS navigation units. A real-time value for cross track error can be extracted from the GPS navigation unit for use in another device. This process is important to the present invention. The present invention proposes a new type of GPS-based display which can be quickly interpreted. Its operation will be described following a brief explanation of GPS-based flight planning. FIG. 5 shows an aircraft flying from the same origin and to the same destination as the flight shown in FIG. 1. However, in this case, VOR-based navigation will not be used. Because GPS navigation units function practically anywhere (so long as there is a clear upward view), they are not constrained by terrain or the curvature of the earth. Thus, the GPS-based flight plan can be the shortest line between the origin and destination-subject to Air Traffic Control and other practical limitations. The result is GPS track 26, which is calculated to provide smooth turns during departure and approach and to provide the shortest flight path. The reader will observe that the aircraft actually follows ground track 14, which wanders around the GPS track. This deviation results from the fact that the pilot was unable to precisely follow the GPS track.

Many GPS devices can provide a "plan view" display, including a desired course, the aircraft's actual position, and the aircraft's ground track. Such displays are quite useful for staying generally on course. However, those skilled in the art will know that the pilot must regularly scan a number of instruments (particularly true in instrument flying). A good instrument design is one which conveys the critical information very rapidly, so that a one-second glance is sufficient. Conventional GPS displays do not serve this purpose well.

In the example of FIG. 5, the pilot can see his or her position with respect to the ground track, and can often see a numerical display of the cross track error, but he or she must refer to another instrument for heading information (typically a gyro compass). The pilot must then mentally integrate the displays provided by at least two separate instruments in order to estimate an appropriate course correction. As discussed initially, this process greatly increases the pilot's workload.

A more direct approach to communicating course correction information to the pilot can eliminate this problem. A simple steering indicator is ideal. Such a display tells the pilot to turn right or left, and preferably gives an indication of the turning amount and/or rate required.

The present invention presents a GPS steering needle instrument which helps a pilot precisely follow a predefined GPS track by providing direct steering commands. The instrument analyzes the aircraft's ground track and compares it to the predefined GPS track, then uses this information to create a computed intersection track. The aircraft's actual velocity along the ground is then compared to the computed intersection track to create a heading angle error between the aircraft's instantaneous velocity and the computed intersection track. The value for the heading angle error is then used to drive the GPS steering needle.

Figure 6:
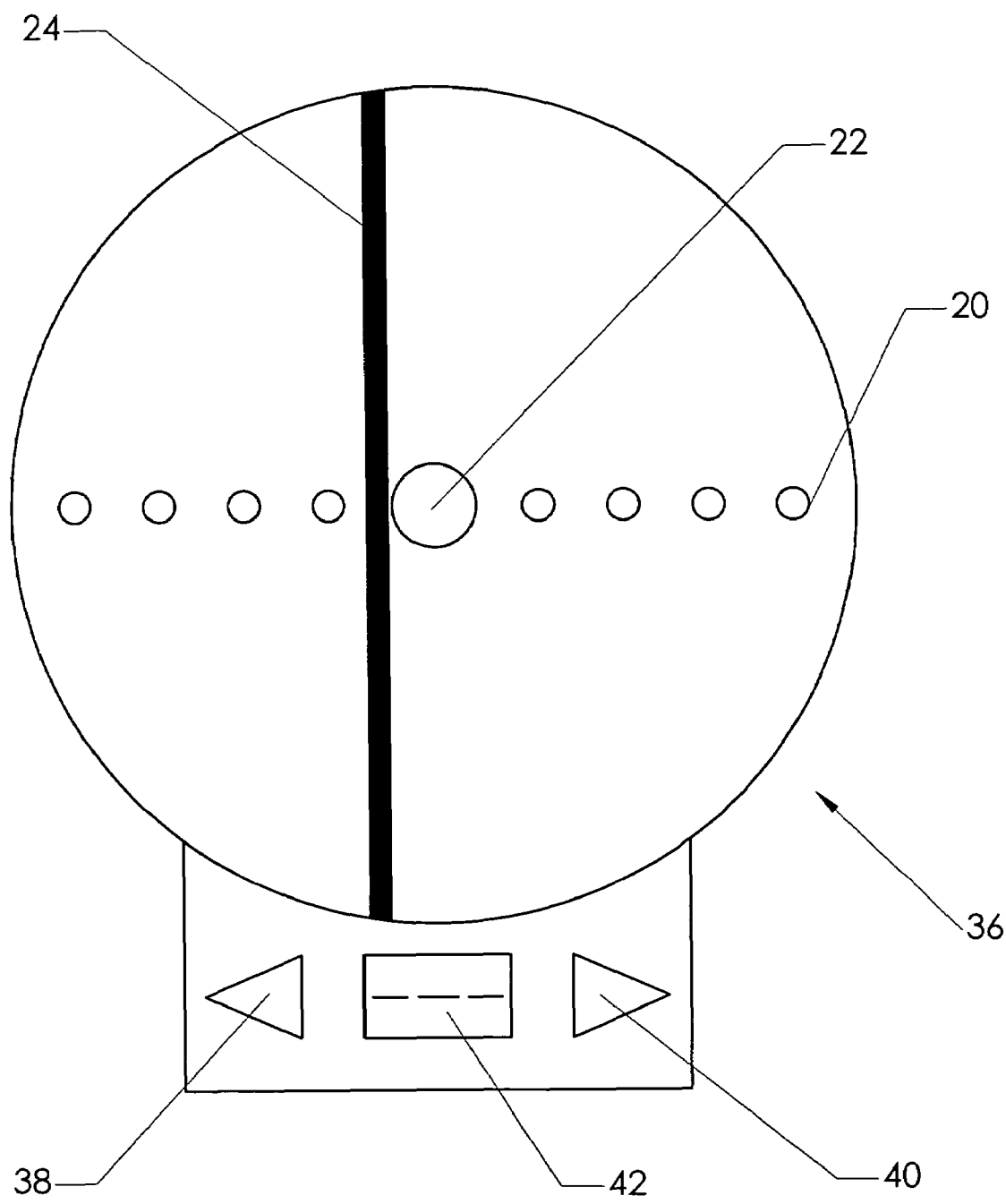
FIG. 6 is a schematic view, showing the operation of the proposed GPS steering indicator.

FIG. 6 schematically displays the proposed instrument, denoted as GPS steering indicator 36. The instrument can have a round display surface facing the pilot (It need not be round, but this is conventional). The display surface features several markings. These are center 22, and a set of left and right reference markers 20. Indicator needle 24 is a vertical line which translates left and right across the display surface (or rotates left and right, as described subsequently). It moves in response to indicate the required turn to remain on course. If the aircraft is precisely on the desired track and the aircraft's velocity vector lies precisely on the desired track, then indicator needle 24 will be centered over center 22. If the aircraft deviates to the right of the desired track (or if the aircraft's velocity vector will take it to the right of the track), then indicator needle 24 will move to the left to indicate that a left turn is needed to put the aircraft back on course. If the aircraft deviates to the left of the desired track (or if the aircraft's velocity vector will take it to the left of the track), then indicator needle 24 will move to the right to indicate that a right turn is needed.

The instrument is preferably marked to inform the pilot that it displays steering commands rather than more conventional values such as cross track error. As an example, the phrase "STEERING INDICATOR" might be printed across the display surface. For purposes of visual clarity, such markings have not been shown.

The movement of the indicator needle is preferably proportional to the turn needed for course correction. In other words, the greater the heading correction needed to put the aircraft back on course or to maintain course, the more the indicator needle deflects from center. The sensitivity of the indicator needle deflection is preferably made non-linear or adjustable, as will be explained in detail subsequently. Other features are shown in the embodiment of FIG. 6. These will be described in more detail subsequently.

Thus, the reader will understand that pilot can obtain all needed heading correction information from simply monitoring the position of indicator needle 24. If it moves to the left of center, the pilot turns to the left. If it moves to the right of center, the pilot turns to the right.

Figure 7:
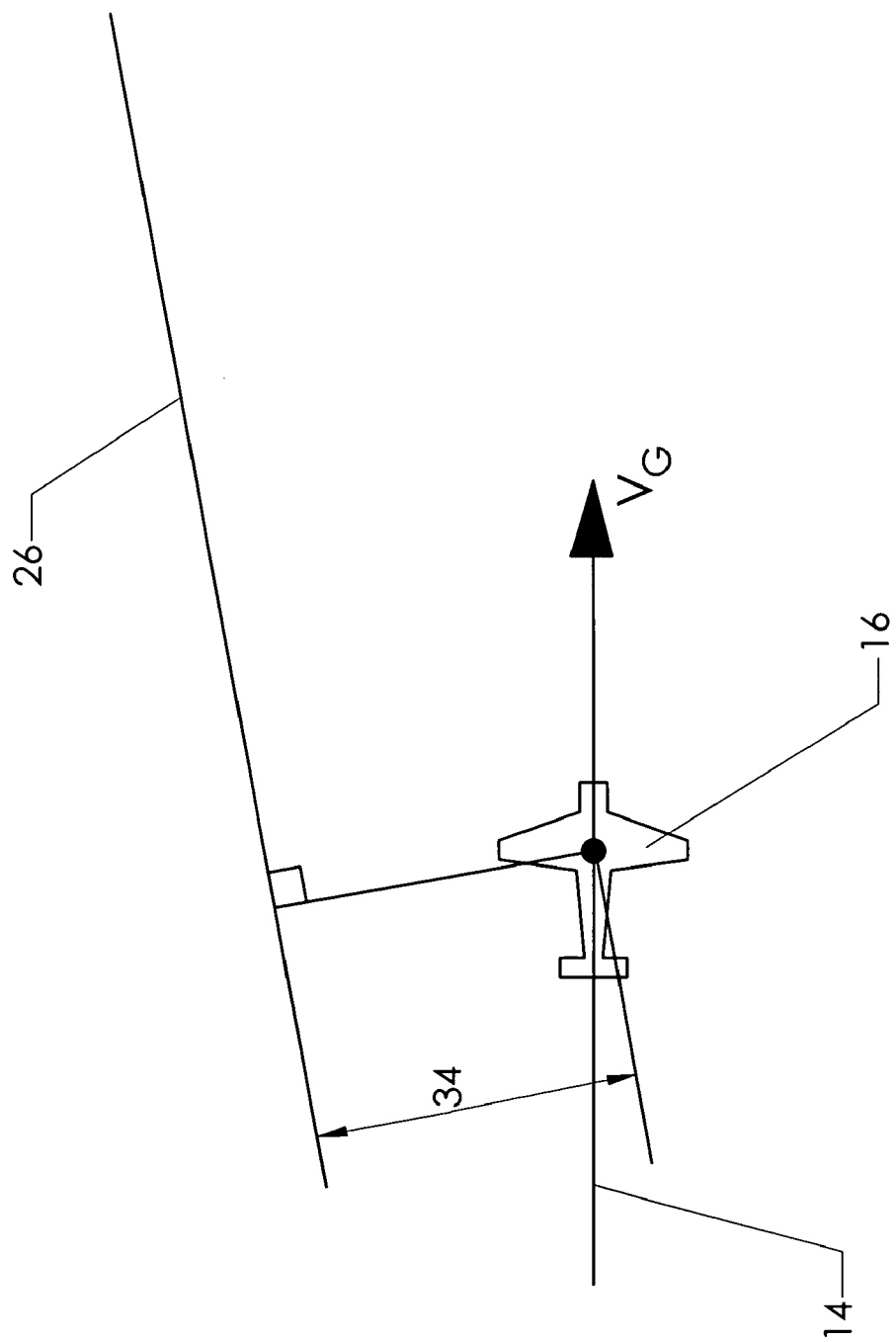
FIG. 7 is a plan view, graphically depicting the data available from a GPS navigation unit.

FIG. 7 graphically illustrates some of the useful data available from the GPS navigation unit. The position of aircraft 16 is known with respect to GPS track 26. The aircraft's ground track 14 is known. The aircraft's velocity vector along the ground (with the term "vector" having its common meaning of the magnitude and direction of movement) is known. Cross track error 34 may be readily computed. These values can then be used to create a smooth intersection track which will guide the pilot onto GPS track 26.

The computed intersection track can be computed using a variety of techniques known to those skilled in the art. The algorithm for computing the intersection track will preferably consider:

1. Cross track error;
2. The aircraft's present velocity vector; and
3. Maximum intercept angle between the present commanded track and the desired track between defined waypoints.

Figure 8:
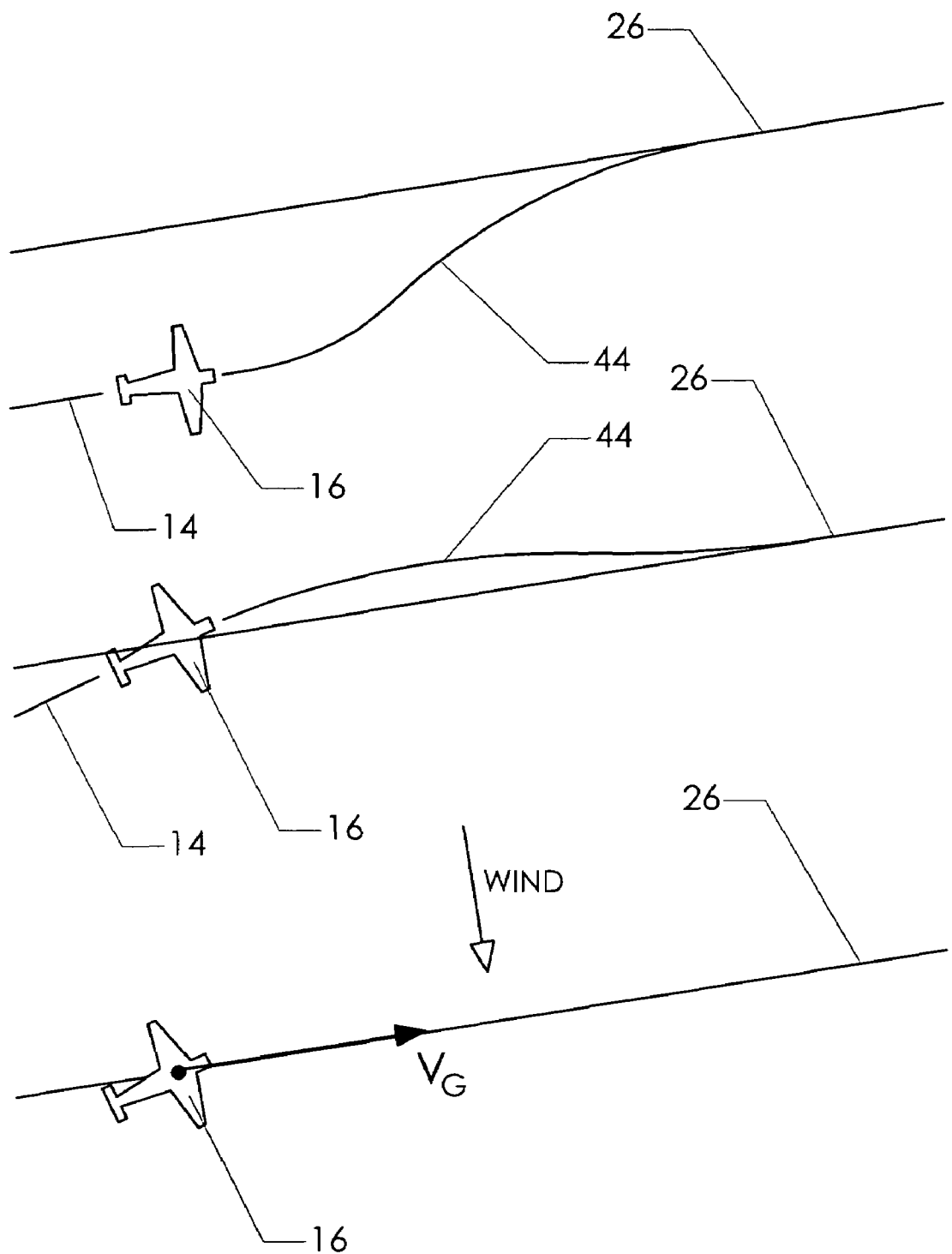
FIG. 8 is a plan view, showing the creation of computed intersection tracks

FIG. 8 shows several typical computed intersection tracks. The upper view shows an aircraft flying some distance off of GPS track 26. Computed intersection track 44 includes a left turn, a straight portion, and a right turn. It smoothly merges into the GPS track.

The middle view of FIG. 8 shows an interesting situation where the aircraft's position is right on top of the GPS track, but its velocity vector will shortly carry the aircraft off to the left. This situation is interesting because most prior art navigation instruments (other than a flight director) would at this point provide little useful information. They would simply inform the pilot that he or she is directly on the desired track, without informing the pilot that the aircraft's present heading will soon carry it off the track. Using the available GPS data, however, a computed intersection track 44 can be created to handle this situation as well. The computed track suggests a right turn followed by a left turn to merge back into GPS track 26.

The lower view of FIG. 8 is another interesting situation. The aircraft is directly over the GPS track and its velocity vector lies perfectly along the GPS track. However, because of a cross wind, the aircraft's gyro compass heading is substantially off the heading of the GPS track. If the pilot knows the heading of the GPS track, he or she will observe a different heading on the gyro compass and would ordinarily have to estimate the cross wind (with frequent adjustments to the "crab angle" in order to stay on course). The GPS steering indicator needle would be centered in this situation, however. Indicating to the pilot that no turn is needed.

FIG. 9 illustrates two different types of computed intersection tracks. In the upper view, the aircraft is approaching GPS track 26 and must make a substantial maneuver to merge onto the track. In the lower view of FIG. 9, by contrast, the aircraft is already flying along the GPS track. When the aircraft deviates course, a computed intersection track 44 must be created to put the aircraft back on the GPS track. But this computed intersection track can be relatively simple and involve only small corrections. Thus, the reader will appreciate that it may be desirable to use at least two of the many available algorithms to drive the GPS steering indicator. One algorithm can be used when the aircraft is approaching the GPS track or is otherwise far off course. The second algorithm can be used to make small corrections to keep the aircraft flying along the GPS track.

Now that the reader has an understanding of the computed intersection track and how it is created, an explanation of how the computed intersection track can be used to drive the needle deflection in the GPS steering indicator can be given. The reader should bear in mind that many different mathematical approaches could be taken. The following explanation is merely one example and should in no way limit the scope of the invention.

Figure 10:
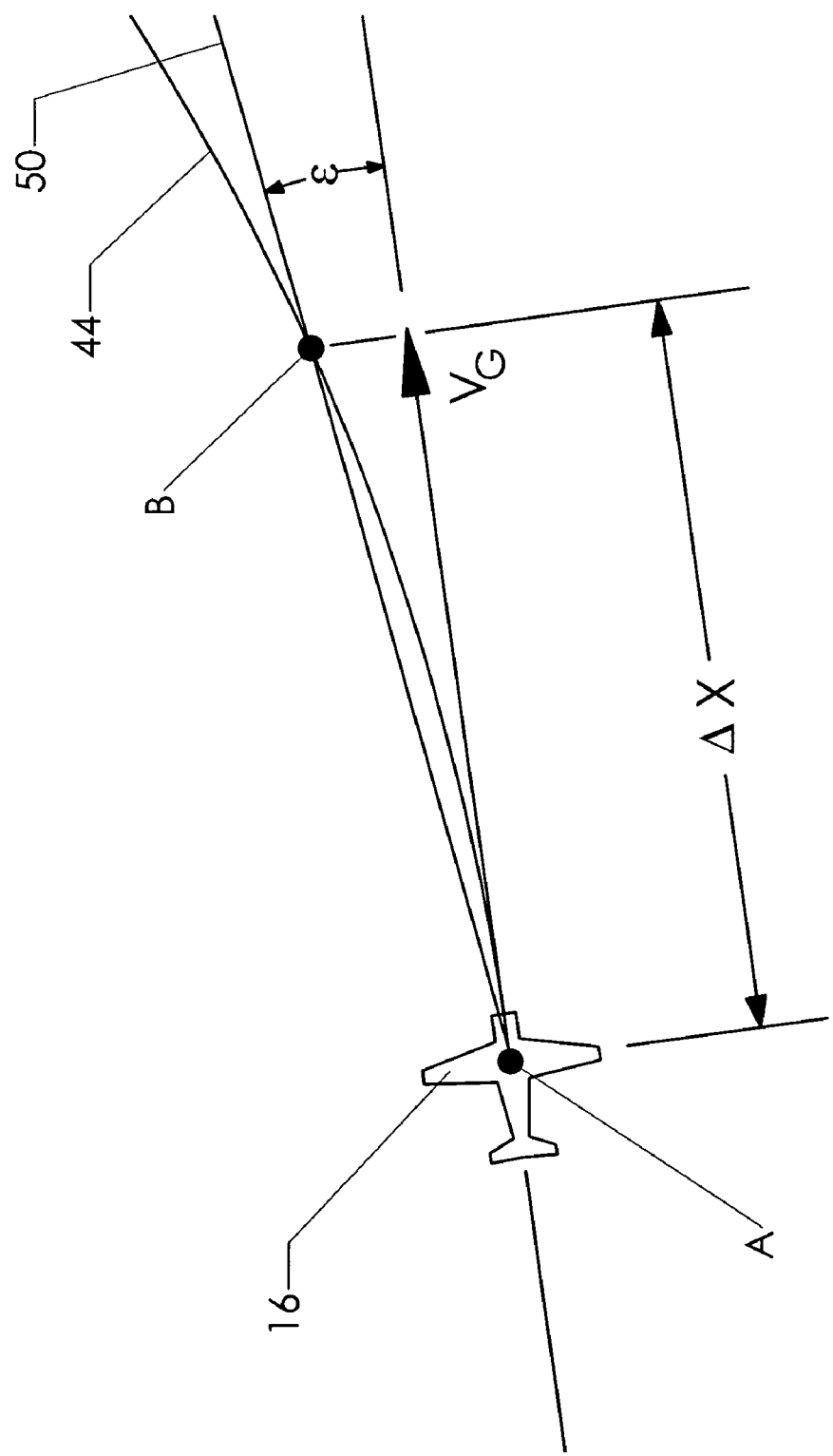
FIG. 10 is a plan view, graphically depicting the computation of a heading angle error to drive the GPS steering indicator.

FIG. 10 shows aircraft 16 flying along a straight course. A computed intersection track 44 has been created, thereby informing the pilot that he or she needs to make a turn to the left. Point A is the center of the aircraft. This is known from the GPS navigation unit, as well as the velocity vector along the ground ($V_G$). Point B is found by proceeding a distance $\Delta X$ along the computed intersection track. Linearized segment 50 is formed bypassing a straight line through Point A and Point B. The angle between linearized segment 50 and $V_G$ is the heading angle error ($\epsilon$).

The heading angle error is then used to drive the needle deflection in the GPS steering indicator. In its simplest form, the needle deflection equals the heading angle error multiplied by a fixed constant, or:

$$\text{Deflection} = K \cdot \epsilon$$

Figure 11:
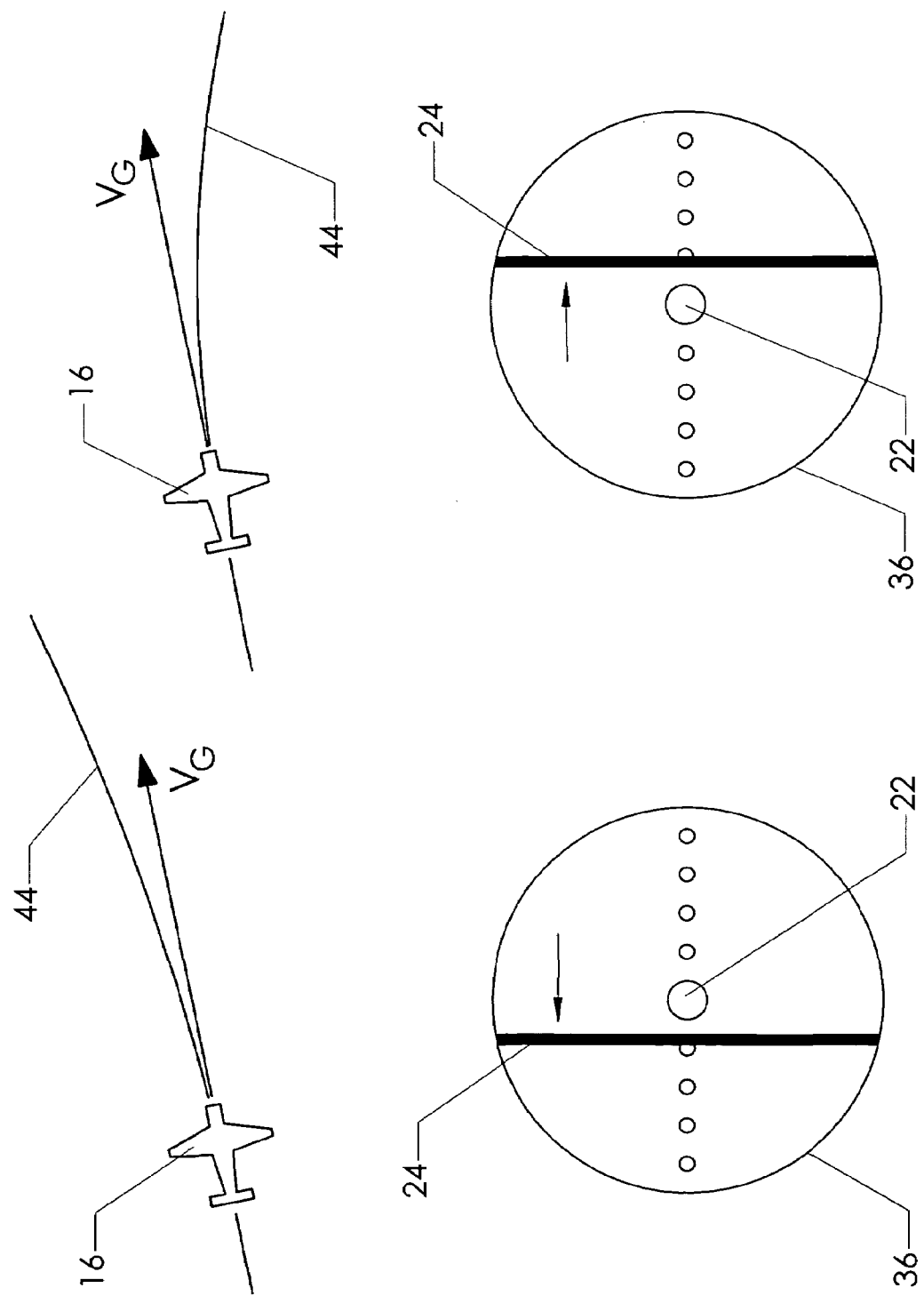
FIG. 11 is a plan view, showing the response of the indicator needle to the heading angle error.

FIG. 11 graphically illustrates this relationship. In the left view, the aircraft is flying into a left turn in computed intersection track 44. Indicator needle 24 moves to the left in GPS steering indicator 36. The needle movement cues the pilot to turn to the left. In the right view of FIG. 11, the aircraft is flying into a right turn in the computed intersection track. The indicator needle therefore deflects to the right.

The reader should note that FIGS. 10 and 11 represents a no-wind condition. If there is a cross-wind, the aircraft's heading will be angularly displaced from $V_G$. The GPS steering indicator actually cues on the aircraft's velocity vector along the ground, rather than the aircraft's actual heading. Thus, cross winds do not alter the efficient simplicity of the device.

Now that the general operation of the invention has been described, some specific embodiments of the indicator will be discussed. FIG. 6 schematically displays the proposed instrument, denoted as GPS steering indicator 36.

The movement of the indicator needle has been explained previously. The indicator can include additional helpful features as well. The embodiment shown in FIG. 6 includes several extra features below the round display. Character display 42 can display numbers and letters in order to provide certain messages. Right turn cue 40 and left turn cue 38 are illuminated to indicate that a gross heading change is immediately impending, as opposed to maintenance of a constant track.

Figure 12:
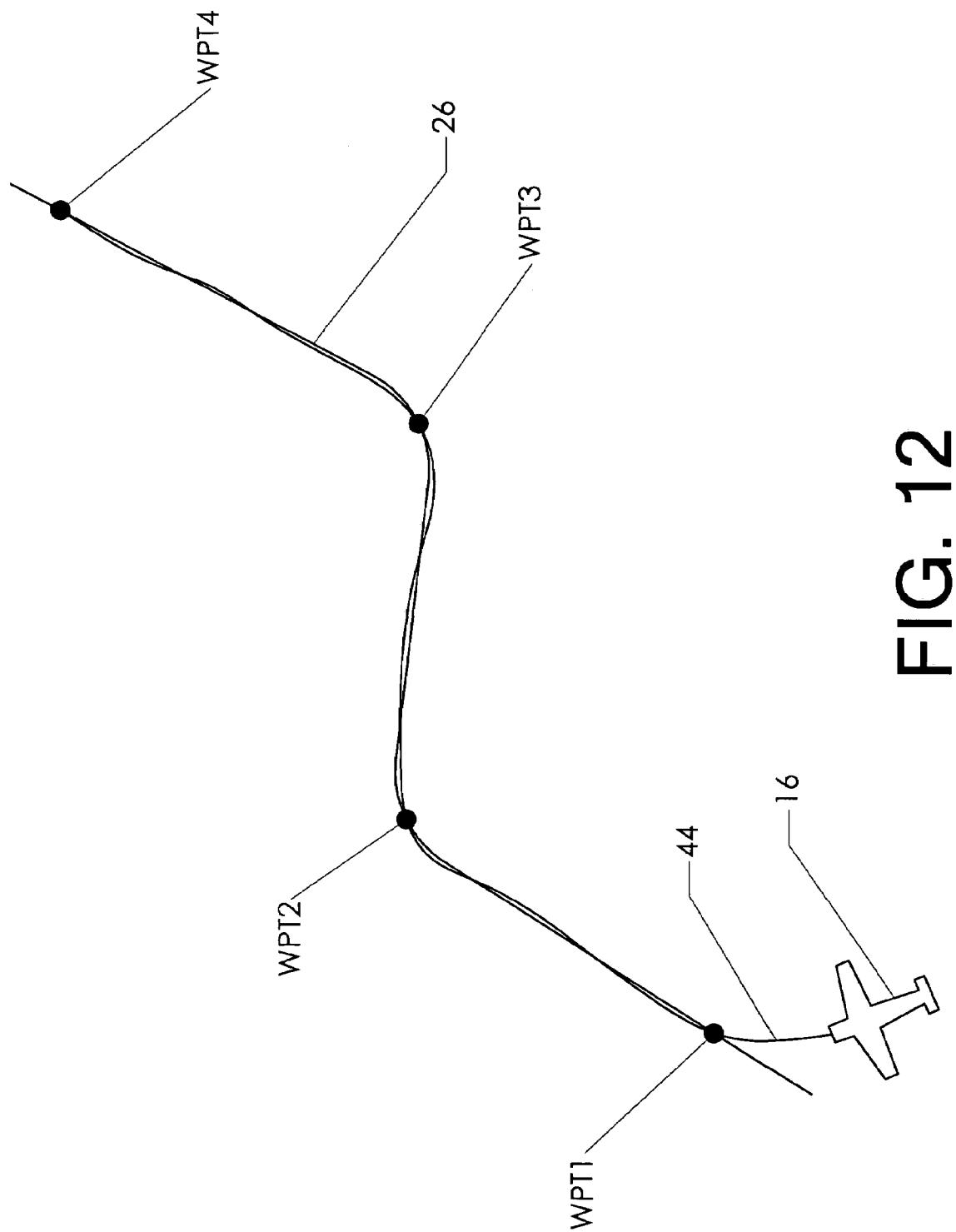
FIG. 12 is a plan view, showing GPS navigation through a series of waypoints.

FIG. 12 shows a smooth GPS track 26 passing through a series of waypoints (WPT1 through WPT4). The aircraft is approaching this GPS track and desires to smoothly merge onto it. A computed intersection track 44 is created to accomplish this objective.

Figure 13:
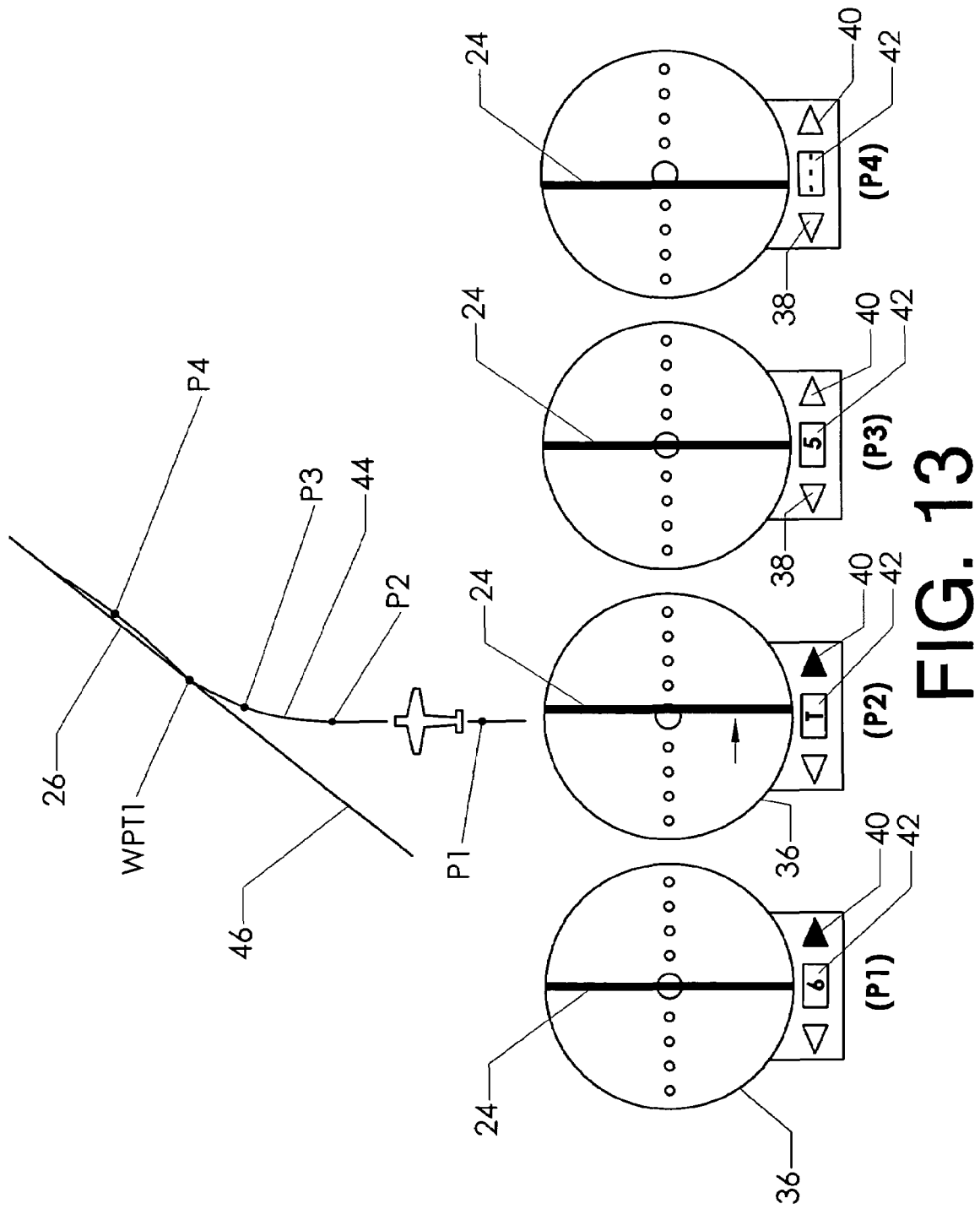
FIG. 13 is a plan view, showing the response of the indicator needle while the pilot flies a computed intersection track.

FIG. 13 shows a detailed view of computed intersection track 14. Computed intersection track 44 starts as a straight line passing through point P1. The GPS steering indicator at this point illuminates right turn cue 40 (This state is shown in the view of the instrument lying above "(P1)" in the figure). Character display 42 counts down to the point at which the turn should begin. As an example, it can be configured to count down from 10 seconds to 0, with "0" being the point at which the pilot should bank the aircraft to the right and enter a right turn.

Point P2 is the commencement of the right turn. At this point, the character display changes to a flashing "T." Indicator needle 24 will deflect to the right as shown, instructing the pilot to turn to the right. The segment lying between Points P2 and P3 is a smooth arc. The needle position will deflect to guide the pilot as to the turn rate required to fly along this smooth arc. If the pilot is executing the proper turn rate, the needle will remain centered. If the turn is too fast, the needle will begin deflecting to the left. If the turn is too slow, the needle will begin deflecting to the right. At point P3 the pilot is approaching the end of the turn. Character display 42 again displays a countdown, though this time it is to the end of the turn. As the pilot is precisely flying the computed intersection track at this point, the indicator needle is centered.

As point P4 is passed, the reader will observe that the turn was continued slightly too far, resulting in the aircraft deviating to the right of GPS track 26. The indicator needle therefore deflects to the left in the view of the instrument corresponding to point P4. The pilot therefore realizes the error and makes a slight turn back to the left to bring the aircraft back on course.

The reader should bear in mind that the countdown display and turn indicators are "optional extras" that are not needed for the complete functioning of the instrument. The pilot only needs to watch the indicator needle and respond with appropriate turns.

Figure 14:
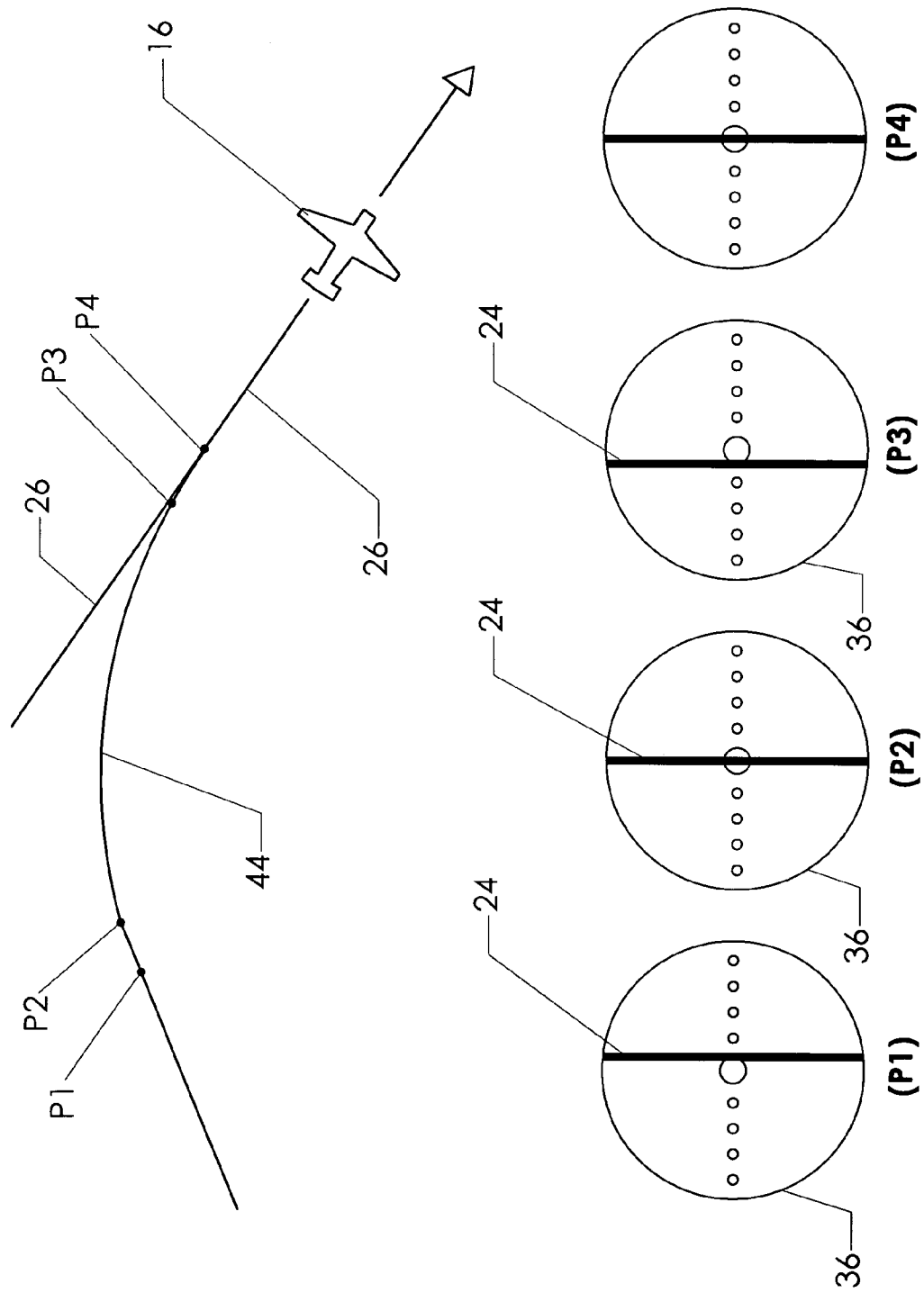
FIG. 14 is a plan view, showing the response of the indicator needle while the pilot flies a computed intersection track.

In some embodiments, the needle deflection itself can be configured to provide "turn anticipation," meaning that the needle will deflect slightly ahead of the time that the plane actually needs to enter the turn. This can be useful, since the pilot's reaction time will always introduce some delay. FIG. 14 shows the use of turn anticipation.

Computed intersection track 14 is created to steer the aircraft onto GPS track 26. The initial portion of the computed intersection track is straight. it continues as straight through Point P1 up to Point P2. At Point P2 it enters a right turn. As the aircraft passes through point P1 the indicator needle is configured to deflect to the right (even though no turn is yet needed). The pilot observes the needle and—after a typical reaction period—turns the aircraft to the right. By the time the aircraft reaches Point P2, it is in an appropriate right turn. Thus, the indicator needle is again centered (see the view of the indicator above (P2) in the view).

The computed intersection track continues in a smooth arc through Point P3 all the way to Point P4. However— accounting again for human reaction time—the instrument can be configured to deflect the needle to the left as the aircraft passes through Point P3. The pilot again experiences reaction time delay, then straightens the aircraft's course. By the time the aircraft reaches Point P4, it will then no longer be turning. The use of such "turn anticipation" therefore reduces oscillating errors when merging onto the GPS track.

The reader may naturally wonder how such "turn anticipation" can be implemented. Again, there are numerous suitable approaches. One very simple one, however, is to use the approach illustrated graphically in FIG. 10. Adjusting the value for ΔX provides turn anticipation. A large value for ΔX provides substantial turn anticipation. A small value provides little anticipation. The reader will note that a very small value for ΔX (ΔX approaches 0) provides no anticipation. The linearized segment in that case would be the first derivative of the computed intersection track. The GPS steering indicator can certainly be implemented using the first derivative. Thus, the amount of turn anticipation is a matter of choice.

As mentioned previously, the degree of indicator needle deflection in response to a given heading angle error can preferably be made adjustable. A simple two position setting can be provided ("fine" versus "coarse") or a scale with infinite variation can be provided for setting according to a particular pilot's preference.

Figure 15:
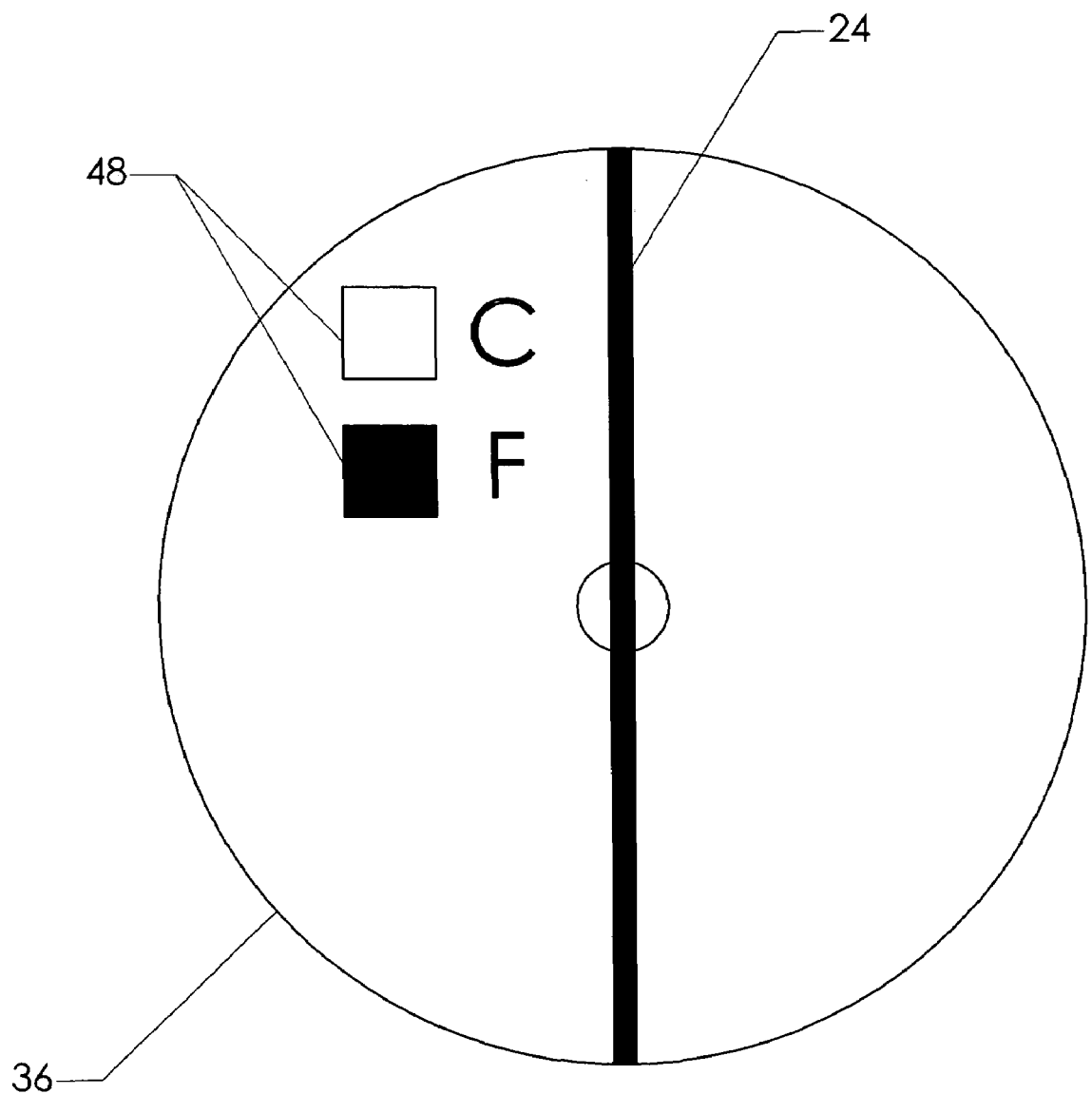
FIG. 15 is a schematic view, showing a fine/coarse indicator.

FIG. 15 shows a GPS steering indicator configured with two sensitivity settings. A switch is provided allowing the pilot to select "coarse" or "fine" mode (not shown). Fine/ coarse indicator 48 displays the mode selected. As an example, a pilot flying a predefined GPS track may wish to deviate course in order to look at a nearby object. This deviation may take the aircraft one or two miles off course. The pilot would set the indicator to "coarse" mode.

Once roughly aligned with the GPS track, the pilot switches to "fine" mode. The indicator needle then becomes quite sensitive to small heading angle errors, allowing the pilot to fly a precise track. Of course, this sensitivity selection could be done automatically. The GPS steering indicator would default to "coarse" mode until the cross track error dropped below a set threshold, at which time it would automatically switch to "fine" mode. The provision of a fine/coarse indicator is significant for automated operation, since the pilot may like to know which mode is active.

More than two sensitivity settings could be provided. Five or more such settings could be automatically or manually selected. Further, the device could use a smooth transition from fine to coarse sensitivity (a non-linear sensitivity). In this embodiment, the GPS steering indicator could have heightened sensitivity when the indicator needle is near the center. The sensitivity would then gradually reduce as the deflection moves toward the right or left of center. Although one can provide an indication of the degree of sensitivity, the pilot can learn to use these sensitivity variations intuitively. The use of such a non-linear display with greater sensitivity toward the center is in fact the preferred embodiment.

The GPS steering indicator can be electrically connected in several ways. The cross track error and rate of change of cross track error outputs from the GPS navigation unit are typically numbers in a digital data field. If an analog GPS steering indicator is desired, then the digital value for the heading angle error cannot be directly used. An analog gauge typically uses a voltage range to drive the display. As an example, the voltage input for an analog GPS steering indicator might be from −5 VDC to +5 VDC. The −5 VDC extreme would be maximum left deflection; 0 VDC would be centered; and +5 VDC would be maximum right deflection.

A digital to analog converter ("D/A converter") would be used to convert the digital value for heading angle error to a voltage for driving the analog display. The D/A converter could then be used to control the sensitivity setting, since one could easily program it to assign a different range of heading angle error to the available DC voltage range. The D/A converter and associated hardware can easily be contained within the same instrument housing as the GPS steering indicator itself. Thus, from the standpoint of installation, one would only need to attach power to the instrument housing and attach the data bus to the GPS navigation unit.

Of course, with modern electronic components, one need not use an analog indicator. GPS steering indicator 36 could be a flat panel LCD display. Rather than a D/A converter, a digital display driver would be used to provide all the markings on the display surface as well as the moving indicator needle. Many additional cues could be added in this type of display—such as turn indicators on the display surface itself.

The reader will therefore appreciate that the computation means needed to translate the cross track error magnitude and rate outputs from the GPS navigation unit into a value for the heading angle error and from thence to an appropriate deflection in the indicator needle can assume many forms. A computer can be used. In the case of an analog heading angle error output feeding an analog indicator, however, a simple analog circuit could provide the necessary "computation means."

Additionally, the proposed instrument should not be thought of as being limited to a stand-alone instrument housing. It could be implemented purely via software and incorporated in a "glass cockpit" flat panel display. The GPS steering indicator would then appear as part of several other graphical displays (with the display surface possibly being rectangular rather than round). The display could also show a multitude of other relevant information, such as ground speed, time-to-go, distance-to-go, desired vertical velocity, etc.

As discussed previously, the computed intersection track s generally created to smoothly intersect a GPS track or to maintain precise flight along a GPS track. The reader's understanding may be aided by the provision of a single algorithm used for these purposes. The following algorithm is one used for relatively precise flight along a GPs track.

EXAMPLE OF COURSE-TRACKING ALGORITHM

Figure 17:
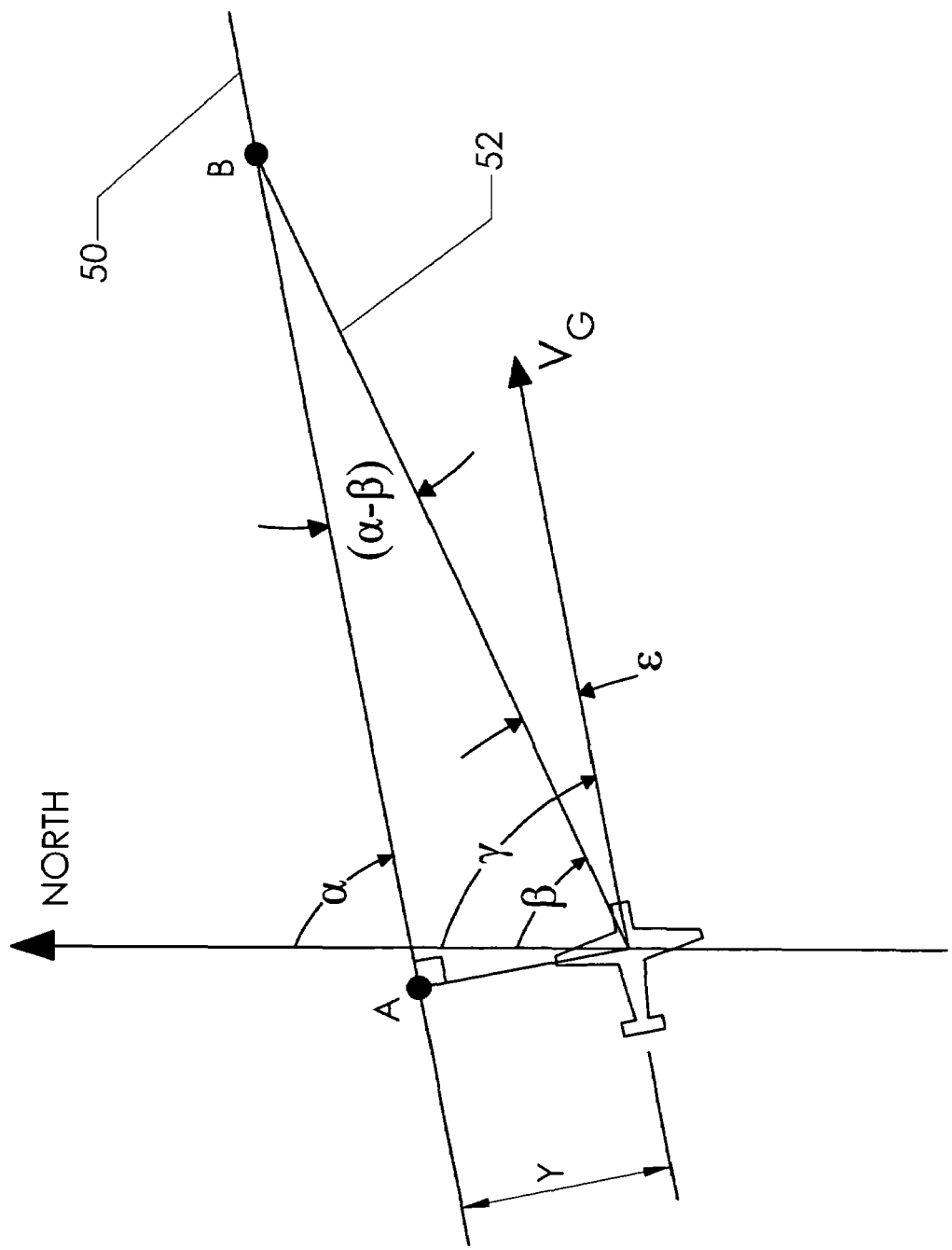
FIG. 17 is a plan view, showing the variables used in a simple tracking algorithm.

A simple algorithm can be used to drive the GPS steering indicator while still accounting for the factors discussed above. The algorithm will be explained with respect to FIG. 17. Aircraft 16 is off course (to the right of the GPS track). The relevant portion of the GPS track is aproximated as linearized segment 50 lying between Points A and B. The algorithm serves to smoothly steer the aircraft back onto this linearized segment.

In order to generate a steering command, the algorithm must compute a currently desired track (shown as currently desired track 52 in the view). The angle between North and the linearized segment is given as α, while the angle between North and the currently desired track is given as β.

Many techniques for determining such a currently desired track are known to those skilled in the art. Such an intercept is denoted in the view as angle β from north. Whatever algorithm is used, it must solve for the heading of the currently desired track (β, the principal unknown). The value for β will be used to determine a heading angle error, which is used in turn to drive the GPS steering indicator.

One example of a course correction algorithm will now be given, with the reader bearing in mind that the invention is in no way limited to this one simple example: Since a violent course correction (such as a 90 degree approach back to the linearized GPS segment) is undesirable, the solution preferably drives the instantaneous difference between α and β to be relatively small. This assumption means that the aircraft's current velocity along the ground ($V_G$) lies very nearly parallel to the currently desired track. One can assume that it lies perfectly parallel to the currently desired track without introducing significant error (since the cosine of a small angle is nearly 1), and this is the assumption made in the basic algorithm. If the cross track error is Y, and the aircraft's velocity along the currently desired track is assumed to be $V_G$, then the expression for the rate of change of the cross track error is:

$$\frac{dY}{dt} = V_G \sin(\alpha - \beta)$$

Those skilled in the art will know that for small angles, the sine of the angle is approximately equal to the angle itself (the angle being expressed in radians). Therefore:

$$\frac{dY}{dt} \approx V_G(\alpha - \beta) \quad \text{(Equation 1)}$$

In this simple example, the desired rate of change of the cross track error is made linearly proportional to the magnitude of the cross track error. This will produce a smoothly curved approach. If a linear constant, K, is used to relate the desired rate of change to the magnitude, then the following expression results:

$$\frac{dY}{dt} = K \cdot Y \quad \text{(Equation 2)}$$

Substituting Equation 2 into Equation 1 produces:

$$K \cdot Y = V_G(\alpha - \beta)$$

Solving for β gives:

$$\beta = \alpha - \frac{K \cdot Y}{V_G}$$

This expression allows a solution for the heading (β) of the currently desired track using the inputs of: (1) The heading of the linearized segment (α), obtained from the GPS navigation unit; (2) The instantaneous ground velocity ($V_G$), obtained from the GPS navigation unit; (3) The magnitude of the cross track error (Y), obtained from the GPS navigation unit; and (4) A defined value for the constant K.

The track correction angle required is therefore the difference between the angle between North and the current value of the aircraft's ground track 14 (γ) (also known from the GPS navigation unit) and the angle between North and the currently desired track (β). In terms of the depiction shown in FIG. 17, the track correction angle required equals γ minus β. This track correction angle is shown graphically as angle ε in the view.

The value for ε is used to drive the deflection of the indicator needle 24 shown in FIG. 6. For a purely linear embodiment of the instrument, the needle deflection can be made linearly proportional to the value for ε. The needle is therefore an indication of real-time heading error. Thus, for the scenario shown in FIG. 17, the needle would initially deflect to the left (as shown in FIG. 6). This information informs the pilot that he or she should turn left.

The algorithm's operation is quite simple. From examining the equations, the reader will observe several principles at work: When the cross track error is large, a relatively large needle deflection will result (commanding a large course correction). Once the aircraft has turned and proceeded toward the GPS track, the cross track error will shrink. As the cross track error becomes relatively small, the algorithm will produce a sign change in the value for the heading angle error. Thus, the algorithm will instruct the pilot to make a turn in the opposite direction in order to smoothly intersect the GPS track. The steering commands produced by the simple algorithm—if followed—will produce a flight path such as computed intersection track 44 shown in the upper view of FIG. 8.

Those skilled in the art will know that additional steps are needed in order to implement the algorithm in software code. These steps would account for sign changes between the α and β input angles (so that the heading error is correctly calculated as 20 degrees rather than 340 degrees). Such components are standard and thus are not described in further detail.

The selection of the values for the constant K also influences the instrument's response. The value for this constant can be adjusted to make the needle deflection more or less sensitive to course deviations. It is even possible to provide several constants, one of which is selected according to the magnitude of the cross track error (a range selection). The constant should also be selected to provide the desired intercept angle for an aircraft turning onto a predetermined GPS track (typically no greater than 40 degrees).

The reader will therefore appreciate that a relatively simple algorithm can be used to generate suitable computed intersection tracks. of course, much more complex algorithms can be used to account for many more factors.

Those skilled in the art will realize that the algorithm described is only one of many possibilities. Numerous types of curve fitting and general navigation algorithms could be used to compute the desired intersection course. The primary novelty of the present invention lies in its ability to provide an instant value for heading error and a visual cueing system to provide that information to the pilot.

Whatever algorithm is used, computer software can be employed to solve the algorithm at fixed intervals using a clock cycle. As an example, the algorithm could be solved at a rate of 20 cycles every second. The discrete value for the heading angle error can then be fed into a digital to analog converter to create an analog output signal. The analog output signal is then used to drive the needle deflection in the GPS steering indicator.

Figure 16:
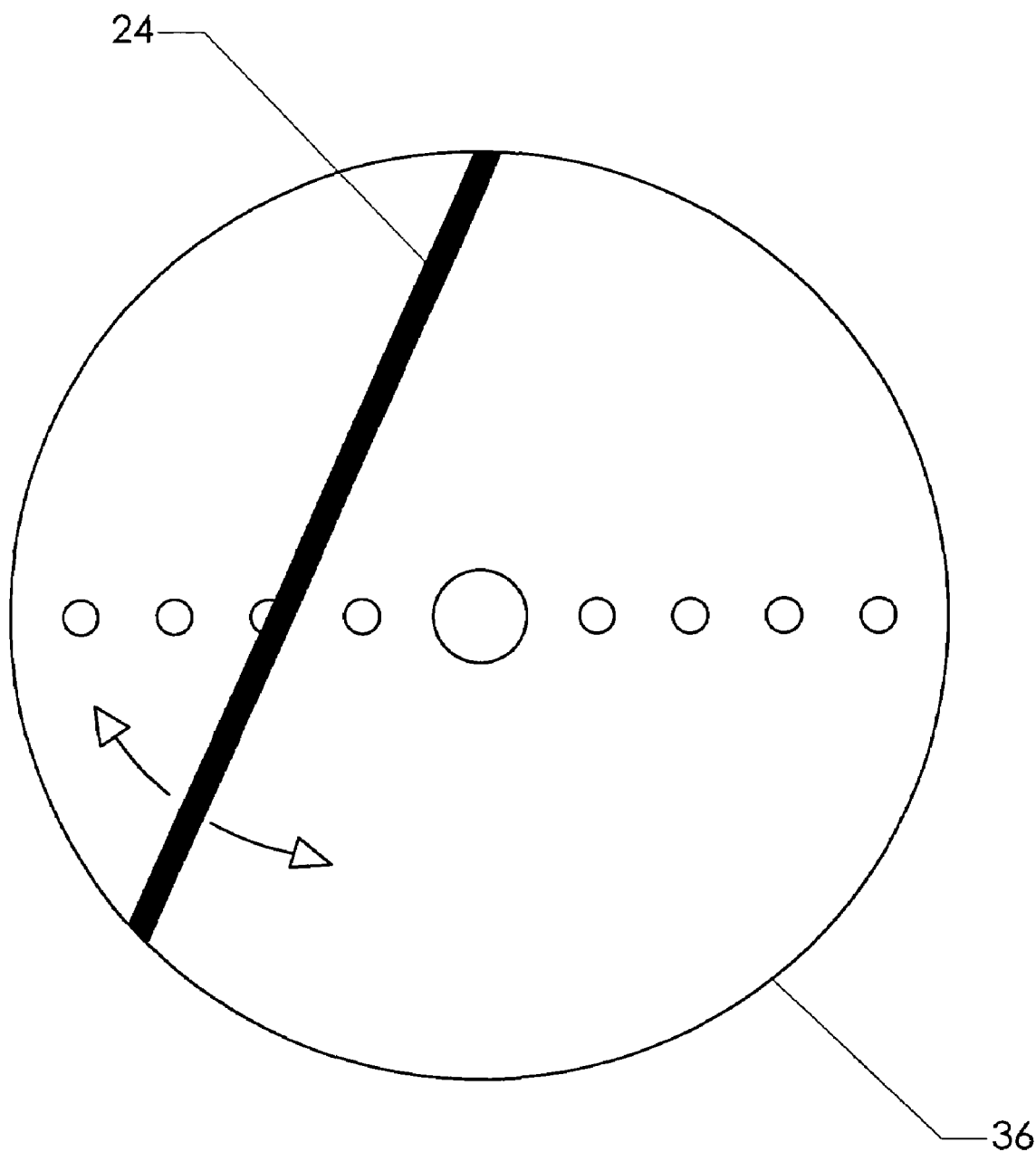
FIG. 16 is a schematic view, showing an alternate embodiment for the indicator needle.

The preceding description contains significant detail regarding the novel aspects of the present invention. It is should not be construed, however, as limiting the scope of the invention but rather as providing illustrations of the preferred embodiments of the invention. As an example, those skilled in the art will know that moving needle indicators such as disclosed herein can assume various forms. FIG. 16 shows an alternate embodiment for GPS steering indicator 36 in which the upper portion of indicator needle 24 is fixed and the lower portion pivots through an arc (rather than the needle simply moving from side to side). This style of deflection can convey the same information and is simply a matter of choice.

Although the application of the invention to a flying aircraft has been discussed throughout, the reader should bear in mind that the invention can be applied to any type of moving conveyance. Aviation is an obvious suitable application, but it is by no means the only application. Thus, the scope of the invention should be fixed by the following claims, rather than by the examples given.

Having described my invention, I claim:

1. A GPS steering indicator for visually displaying heading angle error in a moving conveyance using a GPS navigation unit, wherein said GPS navigation unit has memory means storing a predefined GPS track, and wherein said GPS navigation unit provides GPS data for said moving conveyance with said GPS data including said moving conveyance's position, ground track heading, ground velocity, and cross track error with respect to said predefined GPS track, comprising:
   a. a display;
   b. an indicator needle, movable across said display;
   c. communication means, for receiving said data from said GPS navigation unit;
   d. computation means for determining a heading angle error using said GPS data; and
   e. indicator needle deflecting means for deflecting said indicator needle in proportion to the value of said heading angle error determined by said computation means.

2. A GPS steering indicator as recited in claim 1, wherein said indicator needle is oriented vertically and wherein said indicator needle deflects by moving across said display.

3. A GPS steering indicator as recited in claim 1, further comprising:
   a. a right turn cue for indicating that said GPS track is entering a right turn; and
   b. a left turn indicator for indicating that said GPS track is entering a left turn.

4. A GPS steering indicator as recited in claim 3, further comprising a character display for displaying characters.

5. A GPS steering indicator as recited in claim 1, wherein said display includes a center marker and a plurality of reference markers.

6. A GPS steering indicator as recited in claim 3, further comprising:
   a. wherein said computation means includes means for determining when said moving conveyance is approaching a turn in said predefined GPS track; and
   b. control means for illuminating one of said right turn cue and said left turn cue when said computation means has determined that said moving conveyance is approaching a turn in said predefined GPS track.

7. A GPS steering indicator as recited in claim 6, further comprising:
   a. a character display for displaying characters; and
   b. control means for causing said character display to display a countdown to the commencement of a turn.

8. A GPS steering indicator as recited in claim 1, wherein said indicator needle deflections includes a coarse setting, wherein said indicator needle deflects a relatively small amount for a given amount of said heading angle error, and a fine setting, wherein said indicator needle deflects a relatively large amount for said given amount of said heading angle error.

9. A GPS steering indicator as recited in claim 1, further comprising:
   a. wherein said computation means includes means for determining when said moving conveyance is approaching a turn in said predefined GPS track; and
   b. control means for deflecting said indicator needle in the direction of said turn prior to the point when said moving conveyance reaches said turn.

10. A GPS steering indicator as recited in claim 8, wherein said GPS steering indicator automatically switches between said coarse and said fine settings according to the magnitude of said cross track error.

11. A GPS indicator as recited in claim 8, further comprising a fine/coarse indicator capable of indicating whether said indicator needle deflecting means means is set on said fine setting or said coarse setting.

12. A GPS indicator as recited in claim 10, further comprising a fine/coarse indicator capable of indicating whether said indicator needle deflecting means is set on said fine setting or said coarse setting.

13. A GPS indicator as recited in claim 1, wherein said indicator needle has an upper extreme and a lower extreme, and wherein said indicator needle deflects by said upper extreme remaining substantially fixed and said lower extreme moving through an arc.

14. A GPS steering indicator as recited in claim 4, wherein said character display displays a countdown before each required turn.

15. A GPS steering indicator for visually displaying heading angle error in a moving conveyance using a GPS navigation unit, wherein said GPS navigation unit has memory means storing a predefined GPS track, and wherein said GPS navigation unit provides GPS data for said moving conveyance with said GPS data including said moving conveyance's position, ground track heading, ground velocity, and cross track error with respect to said predefined GPS track, comprising:
   a. a display;
   b. an indicator needle, movable across said display;
   c. communication means, for receiving said data from said GPS navigation unit;
   d. computation means for,
      i. using said predefined GPS track in order to determine a linearized segment that is proximal to said conveyance's position,
      ii. determining a linearized segment heading,
      iii. determining a currently desired track heading,
      iv. determining a heading angle error by determining the difference between said currently desired track heading and said ground track heading; and
   e. indicator needle deflecting means for deflecting said indicator needle in proportion to the value of said heading angle error determined by said computation means.

16. A GPS steering indicator as recited in claim 15, wherein:
   a. said computation means determines said desired heading error by subtracting said cross track error multiplied by a constant and divided by said ground velocity from said linearized segment heading; and
   b. said computation means determines said heading angle error by subtracting said desired rack heading from said ground track heading.

17. A GPS steering indicator as recited in claim 15, wherein said indicator needle is oriented vertically and wherein said indicator needle deflects by moving across said display.

18. A GPS steering indicator as recited in claim 15, further comprising:
   a. a right turn cue for indicating that said GPS track is entering a right turn; and
   b. a left turn indicator for indicating that said GPS track is entering a left turn.

19. A GPS steering indicator as recited in claim 15, further comprising a character display for displaying characters.

20. A GPS steering indicator as recited in claim 18, further comprising a character display for displaying characters.

21. A GPS steering indicator for visually displaying heading angle error in a moving conveyance using a GPS navigation unit, wherein said GPS navigation unit has memory means storing a predefined GPS track, and wherein said GPS navigation unit provides GPS data for said moving conveyance with said GPS data including said moving conveyance's position, ground track heading, ground velocity, and cross track error with respect to said predefined GPS track, comprising:
   a. a display;
   b. an indicator needle, movable across said display;
   c. communication means, for receiving said data from said GPS navigation unit;
   d. computation means for,
      i. determining a computed intersection track for steering said moving conveyance onto said GPS track,
      ii. determining a heading for said computed intersection track proximate said moving conveyance,
      iii. determining a heading angle error by determining the difference between said ground track heading and said heading for said computed intersection track proximate said moving conveyance; and
   e. indicator needle deflecting means for deflecting said indicator needle in proportion to the value of said heading angle error determined by said computation means.

22. A GPS steering indicator as recited in claim 21, wherein said indicator needle is oriented vertically and wherein said indicator needle deflects by moving across said display.

23. A GPS steering indicator as recited in claim 21, further comprising:
   a. a right turn cue for indicating that said GPS track is entering a right turn; and
   b. a left turn indicator for indicating that said GPS track is entering a left turn.

24. A GPS steering indicator as recited in claim 23, further comprising a character display for displaying characters.

25. A GPS steering indicator as recited in claim 21, wherein said display includes a center marker and a plurality of reference markers.

26. A GPS steering indicator as recited in claim 23, further comprising:
   a. wherein said computation means includes means for determining when said moving conveyance is approaching a turn in said predefined GPS track; and
   b. control means for illuminating one of said right turn cue and said left turn cue when said computation means has determined that said moving conveyance is approaching a turn in said predefined GPS track.

27. A GPS steering indicator as recited in claim 26, further comprising:
   a. a character display for displaying characters; and
   b. control means for causing said character display to display a countdown to the commencement of a turn.

28. A GPS steering indicator as recited in claim 21, wherein said indicator needle deflecting means includes a coarse setting, wherein said indicator needle deflects a relatively small amount for a given amount of said heading angle error, and a fine setting, wherein said indicator needle deflects a relatively large amount for said given amount of said heading angle error.

29. A GPS steering indicator as recited in claim 21, further comprising:
   a. wherein said computation means includes means for determining when said moving conveyance is approaching a turn in said predefined GPS track; and
   b. control means for deflecting said indicator needle in the direction of said turn prior to the point when said moving conveyance reaches said turn.

30. A GPS steering indicator as recited in claim 28, wherein said GPS steering indicator automatically switches between said coarse and said fine settings according to the magnitude of said cross track error.

31. A GPS steering indicator as recited in claim 1, wherein said indicator needle deflecting means produces a non-linear deflection with respect to said heading angle error, wherein said needle deflects a relatively large amount when proximate the center of said display and wherein said needle deflects a relatively small amount when distal to said center of said display.

32. A GPS steering indicator as recited in claim 15, wherein said indicator needle deflecting means produces a non-linear deflection with respect to said heading angle error, wherein said needle deflects a relatively large amount when proximate the center of said display and wherein said needle deflects a relatively small amount when distal to said center of said display.

33. A GPS steering indicator as recited in claim 21, wherein said indicator needle deflecting means produces a non-linear deflection with respect to said heading angle error, wherein said needle deflects a relatively large amount when proximate the center of said display and wherein said needle deflects a relatively small amount when distal to said center of said display.

* * * * *